June 13, 1961  G. HAMMESFAHR  2,987,763
VULCANIZATION MOLD FOR RUBBER TIRES AND THE LIKE
Filed June 17, 1958  2 Sheets-Sheet 1

Inventor:
Günter Hammesfahr

BY
Karl F. Ross
AGENT.

June 13, 1961     G. HAMMESFAHR     2,987,763
VULCANIZATION MOLD FOR RUBBER TIRES AND THE LIKE
Filed June 17, 1958     2 Sheets-Sheet 2

Inventor:
Günter Hammesfahr

BY Karl F. Ross
AGENT.

United States Patent Office

2,987,763
VULCANIZATION MOLD FOR RUBBER TIRES AND THE LIKE
Günter Hammesfahr, Altendorferstrasse 40b, Essen, Germany
Filed June 17, 1958, Ser. No. 742,649
9 Claims. (Cl. 18—6)

My present invention relates to a mold for the vulcanization of rubber tires and similar bodies under conditions of heat and pressure.

In my co-pending application Ser. No. 679,187, filed August 20, 1957, I have disclosed a vulcanization mold in which the rubber body can be exposed to simultaneous treatment by a heating fluid passing through a tube in its interior and a radiant heat source rotatably mounted on an annular or sector-shaped carrier externally of the mold.

My present invention has for its object the provision of improved and simplified means for mounting the mold on a column supporting the rotatable carrier and for keeping the mold closed during the curing or vulcanizing operation. More particularly, it is an object of this invention to provide foolproof closure means for the mold preventing it from being opened prematurely. A still further object of the invention is the provision of a lightweight but rigid supporting structure for the mold halves co-operating with the aforesaid closure means to maintain the mold locked.

A feature of my invention resides in the provision of a central hub for each mold half from which ribs extend radially, like spokes, toward the mold; with the mold axis vertically positioned, as is customary, the ribs of the upper, detachable mold half are preferably joined to a central abutment which overlies a locking element joining the two hubs together, such as a screw bolt, whereby this element cannot be removed without simultaneous lifting of the upper mold half from the lower one. In this manner the two hubs cannot be detached from each other until the rotatable heating jacket has been moved aside and pressure within the mold has been sufficiently released to enable ready separation of the mold halves.

The invention will be described in greater detail with reference to the accompanying drawing in which.

Figure 1:
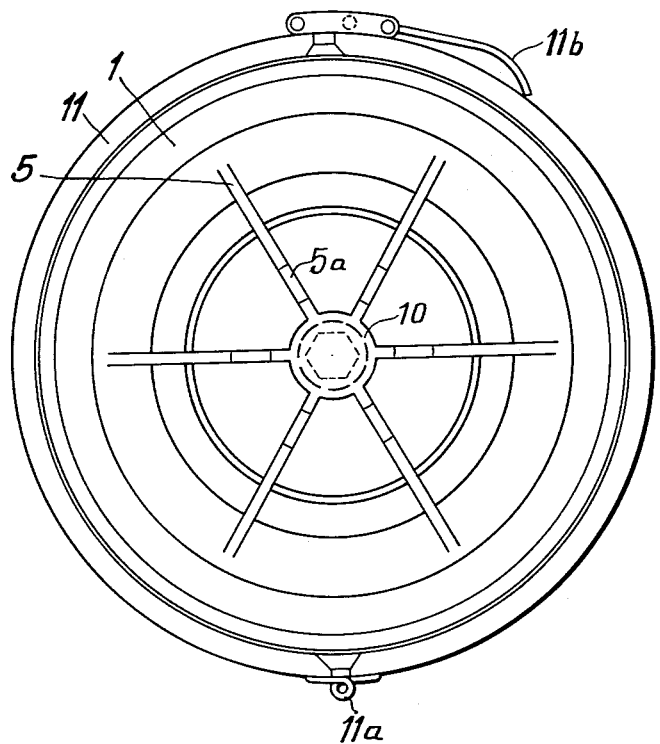
FIG. 1 is a top plan view of a mold embodying the invention.
Figure 2:
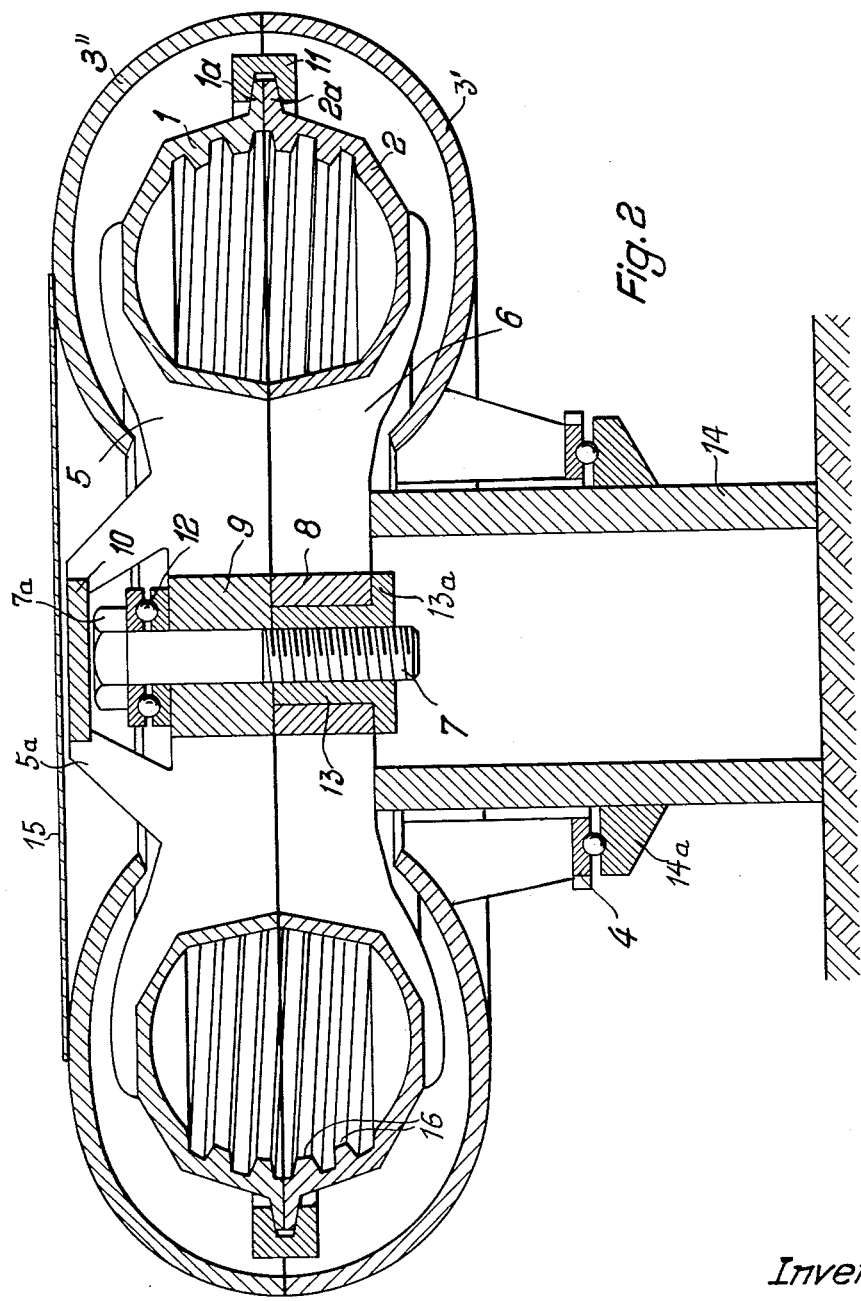
FIG. 2 is an elevational view, in axial section, of the mold and its surrounding heating jacket in operative position.

The mold shown in the drawing consists of two complementary annular halves, including an upper half 1 and a lower half 2. A plurality of angularly spaced, radially extending ribs 5 (here six) rigidly connect the upper mold half 1 with its central hub 9 which is provided with a bore accommodating a screw bolt 7. In similar manner, a set of radial ribs 6 connect the lower mold half 2 with its hub 8 whose bore is large enough to receive a nut 13, this nut having a shoulder 13a bearing from below upon the hub 8 to hold the mold halves together as the head 7a of the bolt bears upon hub 9 through the intermediary of a ball bearing 12.

The lower mold half 2 rests with its ribs 6 on a column 14 to which it is rigidly joined. Column 14 bears a radial flange 14a rotatably supporting, through the intermediary of a ball bearing 4, an annular heating jacket surrounding the mold 1, 2. This heating jacket consists of a lower shell 3' and of an upper shell 3" and mounts on its inside a system of heating elements (not shown) adapted to direct radiant energy through the mold walls toward the body of rubber to be vulcanized. The upper shell 3" of the heating jacket carries a lid 15 and may be lifted off the lower shell 3' by suitable means (e.g. an electromagnet).

Each rib 5 is formed with a spur 5a slanting upwardly toward the mold axis and merging into a disk 10 which forms an abutment overlying the head 7a of bolt 7. The strength of the ribs 5, reinforced by the disk 10, will generally be sufficient to keep the mold tight when the bolt 7 is screwed firmly to nut 13. As a precautionary safety measure, however, I prefer to add a clamping ring 11 which engages the outwardly extending radial flanges 1a, 2a of mold halves 1 and 2 and whose two semicircular halves, hinged at 11a, can be releasably interconnected by a retaining device 11b.

The interior of mold halves 1 and 2 is shown provided with inner peripheral ribs 16 defining the treads of a rubber tire to be vulcanized. These treads oppose the separation of the mold halves so long as the tire is prevented from collapsing by the presence of a heating fluid under pressure in a tube occupying the interior of the tire. Upon the release of this pressure, the removal of shell 3" of the heating jacket, and the detachment of clamping ring 11, the mold can be opened by the insertion of a suitable tool, such as a wrench, between the ribs 5 to engage the head 7a of bolt 7. As the bolt is turned, the upper mold half 1 rotates with it and is slowly lifted off the lower half 2 by the engagement of bolt 7a with abutment disk 10. In the case of heavy-duty tires for bulldozers, tractors and the like, whose treads may not readily disengage themselves from the ribs 16 by a mere camming action of the ribbed profile, it will be desirable to give the ribs 16 a helical configuration of substantially the same pitch as that of the threads of bolt 7, as illustrated. In this case the upper mold half 1 will unscrew itself from the tire and rise with the bolt 7 as both the bolt and the mold half are rotated in the manner described. The ball bearing 12 facilitates such limited rotation of bolt 7 relative to hub 9 as may be necessary for final tightening or in the initial phase of an unscrewing operation.

Although the disk 10 has been shown integral with the spur 5a or ribs 5, it will be understood that the same could also be made detachable if this were desired.

The invention is, of course, not limited to the specific features described and illustrated but may be embodied in numerous modifications and adaptations without departing from the spirit and scope of the appended claims.

It will be understood that the provision of widely separated ribs 5 and 6 between the annular body and the central hub of each mold half materially reduces the thermal capacity of the mold, compared with conventional solid molds, whereby the heating of the tire to the desired temperature will be greatly accelerated; moreover, the upper mold half may be provided with projections between these ribs facilitating its engagement by a suitable hoist. Finally, these ribs impart to the mold a measure of elasticity whereby the vulcanizing pressure within the mold will be so distributed between clamping ring 11 and locking bolt 7 that neither of these fastening elements will be detachable (notwithstanding the presence of ball bearing 12) until the pressure fluid has been removed from the interior of the vulcanized tire.

I claim:

1. A vulcanizing device comprising a pair of complementary annular mold halves of generally semi-circular cross-section together forming a closed toroidal mold and detachably adjoining each other in a plane transverse to the mold axis; a central hub for each of said mold halves; two sets of radial ribs respectively connecting said hubs with said mold halves, each of said ribs being in the shape of a plate lying in an axial plane, the minimum dimension of said ribs in axial direction being equal to at least a major portion of the radius of said semi-circular cross-section, each of said ribs having one edge in said transverse plane and engaging the respective mold half over more than half the perimeter of its semi-circular cross-section; releasable fastening means co-axially joining said hubs together; a carrier for a radiant heat source including two complementary annular shells adjoining each other in said transverse plane and respectively surrounding major portions of said mold halves while overlying part of the space separating said mold halves from said hubs; and mounting means for said mold halves and said carrier enabling relative rotation therebetween about said axis.

2. A vulcanizing device comprising a pair of complementary annular mold halves of generally semi-circular cross-section together forming a closed toroidal mold and detachably adjoining each other in a plane transverse to the mold axis; a central hub for each of said mold halves; two sets of radial ribs respectively connecting said hubs with said mold halves, each of said ribs being in the shape of a plate lying in an axial plane, the minimum dimension of said ribs in axial direction being equal to at least a major portion of the radius of said semi-circular cross-section, each of said ribs engaging the respective mold half over more than half the perimeter of its semi-circular cross-section and contacting a corresponding rib of the other set within said transverse plane over substantially the entire distance between said hubs and said mold halves; releasable fastening means co-axially joining said hubs together; a carrier for a radiant heat source including two complementary annular shells adjoining each other in said transverse plane and respectively surrounding major portions of said mold halves while overlying part of the space separating said mold halves from said hubs; and mounting means for said mold halves and said carrier enabling relative rotation therebetween about said axis.

3. A vulcanizing device comprising a closed mold with vertical axis consisting of an upper and a lower mold half of generally semi-circular cross-section detchably adjoining each other in a horizontal plane to form a closed toroidal mold; a central hub for each of said mold halves; an upper and a lower set of radial ribs respectively connecting said hubs with said mold halves, each of said ribs being in the shape of an upright plate with a minimum vertical dimension equal to at least a major portion of the radius of said semi-circular cross-section, each of said ribs having a horizontal edge in said plane and engaging the respective mold half over more than half the perimeter of its semi-circular cross-section; releasable fastening means co-axially joining said hubs together; a carrier for a radiant heat source including two complementary annular shells adjoining each other in said plane and respectively surrounding major portions of said mold halves while overlying part of the space separating said mold halves from said hubs; and mounting means for said mold halves and said carrier enabling horizontal rotation therebetween.

4. A vulcanizing device comprising a closed mold with vertical axis consisting of an upper and a lower mold half of generally semi-circular cross-section detachably adjoining each other in a horizontal plane to form a closed toroidal mold; a central hub for each of said mold halves; an upper and a lower set of radial ribs respectively connecting said hubs with said mold halves, each of said ribs being in the shape of an upright plate with a minimum vertical dimension equal to at least a major portion of the radius of said semi-circular cross-section, each of said ribs engaging the respective mold half over more than half the perimeter of its semi-circular cross-section and contacting a corresponding rib of the other set within said plane over substantially the entire distance between said hubs and said mold halves; releasable fastening means co-axially joining said hubs together; a carrier for a radiant heat source including two complementary annular shells adjoining each other in said plane and respectively surrounding major portions of said mold halves while overlying part of the space separating said mold halves from said hubs; and mounting means for said mold halves and said carrier enabling relative horizontal rotation therebetween.

5. A vulcanizing device according to claim 4 wherein said mounting means includes a tubular column supporting said lower set of ribs at a location between said hubs and said mold halves.

6. A vulcanizing device according to claim 5 wherein said upper set of ribs are formed with upstanding spurs above said column, further comprising abutment means above said hubs engaged by said spurs and bracing them against one another, said abutment means removably overlying said fastening means.

7. A vulcanizing device according to claim 4 wherein said fastening means includes a threaded bolt insertable into said hubs from above, said upper shell being provided with cover means overlying said bolt and preventing withdrawal thereof from said hubs in the operative position of said carrier.

8. A vulcanizing device according to claim 7 wherein said bolt has a head overlying said second hub, further comprising antifriction means interposed between said head and said second hub.

9. A vulcanizing device according to claim 4 wherein each of said mold halves is provided with an outer peripheral flange, further comprising supplemental clamping means releasably engaging said flanges.

References Cited in the file of this patent

UNITED STATES PATENTS

| | | |
|---|---|---|
| 1,318,383 | Hermsdorf | Oct. 14, 1919 |
| 1,371,321 | Meeham | Mar. 15, 1921 |
| 2,094,511 | Welch | Sept. 28, 1937 |
| 2,495,170 | Kinn | Jan. 17, 1950 |
| 2,509,830 | MacMillan | May 30, 1950 |
| 2,745,137 | Glynn | May 15, 1956 |

FOREIGN PATENTS

| | | |
|---|---|---|
| 664,608 | Great Britain | Jan. 9, 1952 |

UNITED STATES PATENT OFFICE
CERTIFICATE OF CORRECTION

Patent No. 2,987,763                      June 13, 1961

Günter Hammesfahr

It is hereby certified that error appears in the above numbered patent requiring correction and that the said Letters Patent should read as corrected below.

In the heading to the printed specification, between lines 6 and 7, insert the following:

Claims priority, application Germany Nov. 12, 1957

Signed and sealed this 27th day of February 1962.

(SEAL)
Attest:

ERNEST W. SWIDER                      DAVID L. LADD
Attesting Officer                       Commissioner of Patents